US006755955B2

(12) United States Patent
Biegert et al.

(10) Patent No.: US 6,755,955 B2
(45) Date of Patent: Jun. 29, 2004

(54) CATALYTIC CONVERTER AND METHOD FOR PRODUCING A CATALYTIC CONVERTER

(75) Inventors: Hubertus Biegert, Ulm (DE); Gabriele Stäb, Grafenau (DE); Gabor Toth, Illertissen-Jedesheim (DE); Peter Urban, Amberg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/937,223

(22) Filed: Sep. 24, 2001

(65) Prior Publication Data

US 2003/0000843 A1 Jan. 2, 2003

Related U.S. Application Data

(63) Continuation of application No. PCT/EP00/02247, filed on Mar. 14, 2000.

(30) Foreign Application Priority Data

Mar. 23, 1999 (DE) .......................................... 199 12 897

(51) Int. Cl.$^7$ ................................................ C25D 5/18
(52) U.S. Cl. ....................... 205/102; 205/103; 205/104; 205/105; 205/107; 205/108; 205/159; 429/30; 422/177

(58) Field of Search ................................. 205/102, 103, 205/104, 105, 106, 107, 108, 205, 210, 219, 159, 264; 422/177; 429/30

(56) References Cited

U.S. PATENT DOCUMENTS 4,578,156 A * 3/1986 Plazter ........................ 205/213
6,197,179 B1 * 3/2001 Arlt et al. .................... 205/108

FOREIGN PATENT DOCUMENTS

DE      19532170     3/1997
EP       0106197     4/1984

* cited by examiner

Primary Examiner—Wesley A. Nicolas
(74) Attorney, Agent, or Firm—Crowell & Moring LLP

(57) ABSTRACT

A method for producing a catalytic converter includes depositing a layer of catalytically active metallic material by electrochemical deposition on a planar substrate by immersing the substrate in an electrolyte that contains the catalytically active metallic material. A high overvoltage at which a large number of seeds of the metallic material are formed on the substrate is set for a predetermined first time period between the substrate and the opposing electrode. The overvoltage is reduced for a predetermined second time period to a value at which the seeds which are deposited in the first time period grow on the substrate.

8 Claims, 3 Drawing Sheets

CATALYTIC CONVERTER AND METHOD FOR PRODUCING A CATALYTIC CONVERTER

CROSS REFERENCE TO RELATED APPLICATIONS

This application is a continuation of International Patent Application No. PCT/EP00/02247 filed on Mar. 14, 2000 designating the United States of America, the entire disclosure of which is incorporated herein by reference. Priority is claimed based on Federal Republic of Germany patent application No. DE 199 12 897.9, filed Mar. 23, 1999.

BACKGROUND AND SUMMARY OF INVENTION

The invention relates to a catalytic converter and to a method for producing a catalytic converter.

Laid-open Specification JP-A-08 134 682 describes an electroplating method for coating a metallic substrate with a smooth noble metal layer in which a substrate containing iron is provided with a platinum coating.

Patent Specification DE 197 32 170 C2 discloses a method for locally and selectively electrochemically coating a ceramic SiC substrate with a platinum coating. A large surface area is achieved by matching the platinum coating to the rough ceramic surface. The coated substrate is then treated at a raised temperature of more than 400° C.

EP 0 106 197 A2 discloses a method for depositing platinum on a carbon substrate or a semconductor substrate, in which the substrate has a first initial pulse applied to it, followed by a second, longer voltage pulse. The first initial pulse reaches voltage values at which platinum seeds are formed on the substrate surface, while the second pulse leads to the growth of the seeds that have been formed.

An object of the invention is to specify a catalytic converter and a method for producing a catalytic converter which allows the deposition of a catalytically active material with a large surface area and good adhesion strength on a substrate.

The object may be achieved by a catalytic converter and of a method for producing a catalytic converter according to the precharacterizing clauses of the independent patent claims. Further advantages and refinements of the invention are described in the other patent claims and in the description.

According to the invention, a catalytic converter is produced by depositing a layer of catalytically active material on a planar, electrically conductive substrate. In the process, a high overvoltage, which is in a voltage range within which a large number of seeds of the catalytic material are formed on the substrate in the chosen system, is set between the substrate and the opposing electrode for a predetermined first time period. The overvoltage is then reduced, for a predetermined second time period, to a value at which the seeds deposited in the first time period show a growth in size on the substrate.

The deposited layer preferably has metal clusters, which are firmly and directly connected to the substrate. The advantage is that the catalytically active material makes good thermal contact with the substrate, and there is also a very large active surface area without any additional supporting bodies. Furthermore, the adhesion is very good without any need to use costly adhesion promoter layers between the catalytic material and the substrate.

A voltage in the high seed formation range is preferably set repeatedly, followed by a voltage in the controlled seed growth range, particularly preferably periodically and successively.

In further preferred developments, the seed formation range and the seed growth range are set with a different time interval with respect to one another and/or with different voltage levels and/or different oscillations.

It is particularly preferable for at least two AC voltages to be superimposed, and for the superimposed sum voltages to be applied between the substrate to be coated and the opposing electrode. In the process, it may be advantageous to superimpose a DC voltage on the AC voltage as well.

In one advantageous embodiment, the surface to be coated of the substrate is roughened before the coating process, thus forming a mean surface roughness which corresponds approximately to the thickness of the layer.

Metal and/or ceramic and/or carbon is used as the preferred substrate.

Using the method according to the invention, it is possible in a simple and well-controllable manner to produce the deposition of well-adhering catalytically active layers with a very large active surface area, and with a consumption of catalytic material being low. The numbers of seeds and the clustered size can be set reproducibly, and can be optimized for different chemical systems by adaptation of the electrical parameters in a manner which can be controlled well and is easy to derive.

The invention will be described in more detail in the following text with reference to a drawing in which:

DETAILED DESCRIPTION OF THE DRAWINGS

Figure 1:
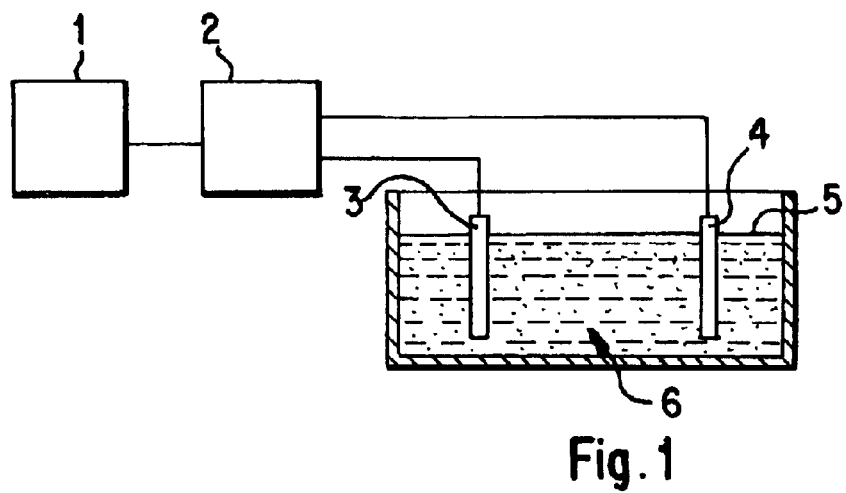
FIG. 1 shows an outline illustration of a layout, shown in section, for producing a substrate coated according to the invention.

FIG. 1 shows an arrangement for carrying out the method according to the invention. A function generator 1 produces a modulated electrical voltage U(t), which is amplified in an amplifier 2 and is applied between an anode 3 and a substrate 4 to be coated, in a deposition bath 5. In addition, there may be a reference electrode (not shown) in order to establish a reference voltage between the substrate and the reference electrode.

The current between the substrate 4, which is used as the cathode, and the anode 3 is recorded and is used as a measure to establish the amount of the catalytically active material 6 which is contained in the deposition bath and that has been deposited. In the process, correction factors such as the charging and discharging of the electrochemical double layer upstream of the electrode are expediently used to correct the measured value.

One good substrate is a metal substrate or a substrate containing carbon, in particular a carbon substrate, a metallic substrate or a metallized ceramic substrate. One good catalytically active material is a Group B element, preferably in the Groups 8 or 1, such as platinum or a material from the rhodium group. One good material for the opposing electrode is nickel, in particular a platinum-coated nickel electrode.

According to the invention, a voltage is applied between the substrate and the opposing electrode such that seeds are formed in the relatively high overvoltage region. The precise values for such a high overvoltage depend on the chosen electrodes, materials and process conditions. By way of example, the text book "Elektrochemie" [electrochemistry] (edited by Hamann, Vielstich, Wiley-VHC-Verlag, 3rd edition, Chapter 4.6) describes these mechanisms on which seed formation and seed growth are based. The suitable parameters for different systems and process parameters can then be established by simple experiments. The appropriate deposition parameters for different catalytic converter systems, in particular an appropriate potential or overvoltage range, can be found by using conventional means, for example cyclic voltammetry, to constrain the overvoltage range.

A very high overvoltage is applied between the substrate 4 and an opposing electrode 3. The reaction kinetics at this high overvoltage result in a large number of seeds of the metallic material 6 to be deposited being formed on the substrate 4 to be coated. This is referred to in the following text as the seed formation range. The deposition process results in the electrochemical potential between the substrate 4 and a reference electrode varying, so that the voltage is then set to a lower, second voltage level for the overvoltage, within the seed growth range, for controlled growth of the seeds. During this phase, the reaction kinetics result in a growth in size of the large number of seeds of the metallic material 6 deposited, on the substrate 4 to be coated. This range is referred to in the following text as the seed growth range. The layer that is formed is porous or is preferably composed of clusters 6.1, preferably approximately spherical clusters, of the deposited metallic material 6.

The application of high overvoltage for seed formation on the substrate 4 to be coated, and of the low overvoltage for seed growth, can in this case be carried out once or for each phase in a specific time period, or else can be repeated a number of times, preferably periodically. Overall, a time-dependent, variable voltage U(t) is advantageously applied between the substrate 4 and the opposing electrode 3, preferably a voltage with a sinusoidal and/or sawtooth and/or square-wave voltage profile, with a voltage maxima of the voltage U(t) at least reaching and/or exceeding the range of high overvoltage with seed formation.

Figure 2:
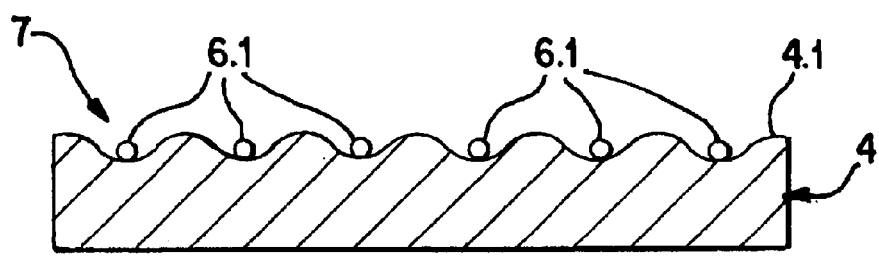
FIG. 2 shows an outline illustration, in the form of a section, of a substrate coated according to the invention.

FIG. 2 shows, in highly simplified form, a cross section through a catalytic converter produced in this way. A substrate 4 having a surface 4.1 which is roughened has, on the surface 4.1, a layer 7 with metal clusters 6.1, which are formed from the catalytically active material 6. The layer 7 is preferably porous, and particularly preferably it is composed of non-cohesive clusters 6.1 of the catalytically active material 6.

The size and the number of the metal clusters 6.1 in the layer 7 can in this case be controlled by means of the deposition parameters. In the process, the voltage U(t) applied between the substrate 4 and the opposing electrode 3 is alternately increased to the seed formation range, and is then reduced to the seed growth range. More clusters 6.1 are formed, the more frequently the seed formation range is reached. The average advantageous diameter for the metal clusters is 2–4 nm, and the highest is 10 nm. An advantageous layer thickness corresponds to 10–20 nm, in particular at most 50 nm. In this case, it is particularly advantageous that only a small amount of catalytically active material 6 is required, with the metal clusters 6.1 in one expedient development of the invention being composed of noble metal. The layer 7 is preferably composed of noble metal for the content of 5–150 $\mu$g/cm$^2$.

The voltage U(t) can be applied with a high overvoltage in the respective voltage range for seed formation and with a low overvoltage as a constant voltage level, $U_1$, $U_2$ in the seed growth voltage range, each of which levels is maintained for respective predetermined times $\Delta_{t_1}$, $\Delta_{t_2}$.

A modulated voltage U(t) formed from the superimposition of an AC voltage and DC voltage component can also advantageously be used, in which at least the voltage maxima which exceed a value which is characteristic of the transition of the seed growth range to the seed formation range will extend for a first time period $\Delta_{t_1}$ into the region of high overvoltage with seed formation. The voltage values between such voltage maxima then correspond to the range of low overvoltage with seed growth, so that the deposited seeds grow for a second time period $\Delta_{t_2}$.

Intrinsically, any desired voltage profile may be used, but periodic profiles are preferably chosen, for example square-wave, sawtooth, sinusoidal or else a sequence of individual voltage pulses.

In this case, the time intervals between successive seed formation phases and/or seed growth phases can be varied, and/or the voltage level is kept constant in the seed formation phase and/or in the seed growth phase itself and/or the time period during which a respective voltage level is kept constant.

Figure 3:
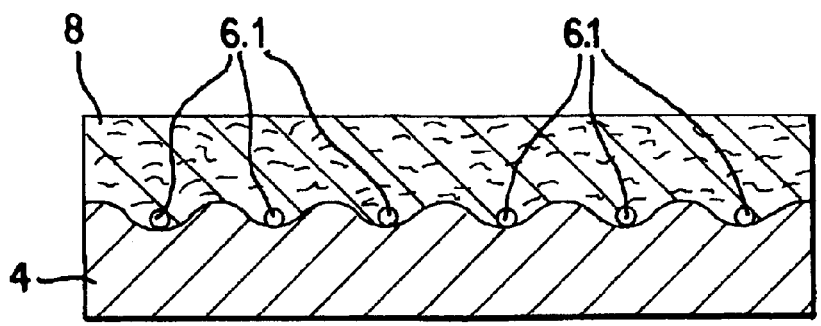
FIG. 3 shows a schematic view of a section through a coated surface.

FIG. 3 shows a further preferred catalytic converter, with an ion-conductive material 8 being arranged on the surface 4.1 to be coated on a substrate 4. This may be, for example, an appropriate ion-conductive membrane or a nonwoven impregnated with chemical substances. The material 8 is preferably applied to the substrate before the deposition of the catalytically active material 6, 6.1. During the deposition process, the catalytically active material 6 passes through the ion-conductive material 8 and is precipitated on the surface 4.1 to be coated, where it forms a porous, catalytically active layer composed of particles or clusters which are insulated from one another. This arrangement is particularly suitable for gas diffusion electrodes for fuel cells, with the ion-conductive material 8 preferably being a gas-permeable polymer electrolyte, and the substrate 4 forming, for example, a carbon electrode. The catalytically active material 6 is then preferably a noble metal such as platinum. The method according to the invention makes it possible to produce a catalytically highly active layer with little of the catalytic converter material being used. The catalytically active material is utilized efficiently.

It is particularly preferable for two AC voltages, $U_1(t)$ and $U_2(t)$ at different frequencies $f_1$, $f_2$ to be superimposed. Periodic voltage profiles such as sinusoidal, square-wave, sawtooth profiles or voltage pulses, are particularly suitable for use as the AC voltage $U_1(t)$, $U_2(t)$.

Only a small amount of hardware is required for superimposition of voltages, and the time sequence of voltage peaks as well as the amplitudes in the seed formation and seed growth phases can be varied within wide ranges by suitable choice of the frequencies and amplitudes for the superimposed voltages. When the two AC voltages $U_1(t)$, $U_2(t)$ are superimposed a beat voltage is formed as the sum voltage $U_{sum}(t)$. FIGS. 4a, 4b, 4c, 4d, 4e, 4f show a number of examples of such superimposed voltages. Not only can sinusoidal voltages be superimposed, but other, preferably periodic, voltage profiles can also be used.

Figure 4A:
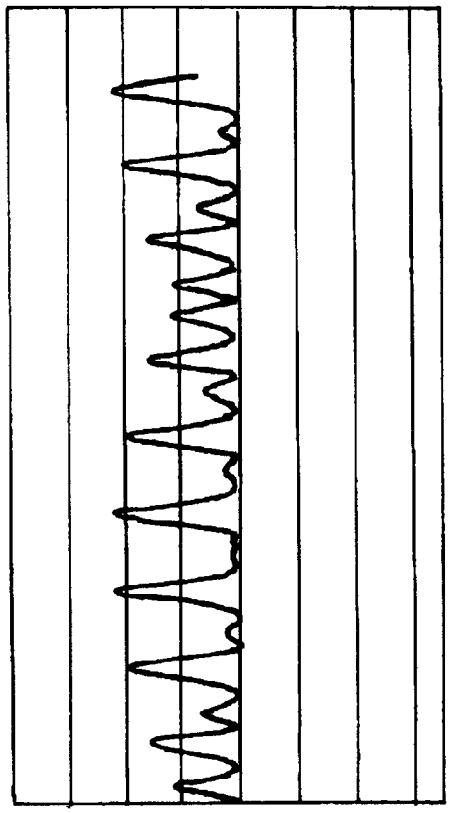
FIGS. 4a–f show examples of various superimposed voltages, with FIG. 4a showing first and second voltages $U_1$ and $U_2$ which are combined to provide a sum voltage $U_{sum}$, FIGS. 4b and 4c showing examples of sum voltages resulting from the superimposition of sinusoidal voltages having different magnitudes, FIG. 4d showing the superimposition of a sinusoidal AC voltage with a sequence of high voltage peaks, and FIGS. 4e and 4f showing superimposition of sinusoidal voltages with sawtooth and triangular waveforms, respectively.
Figure 4B:
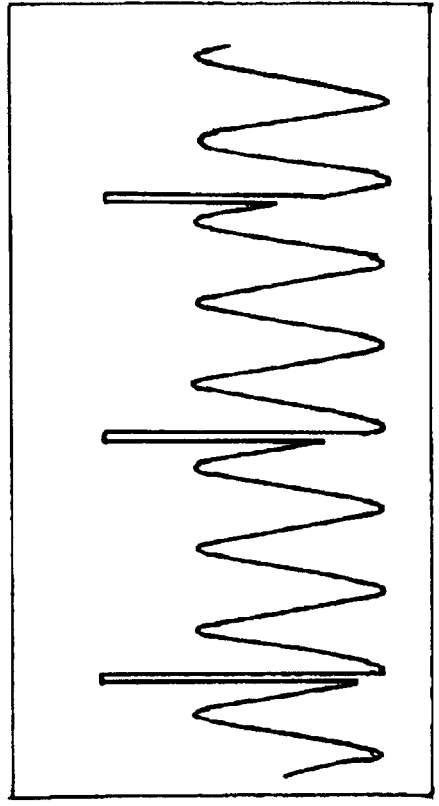

FIG. 4a explains how a beat voltage is formed, using an example. Two sinusoidal voltages $U_1(t)$, $U_2(t)$ are superimposed. The first AC voltage $U_1(t)$ has about half the amplitude, but is at about three times the frequency, of the second AC voltage $U_2(t)$. The resultant $U_{sum}(t)$ has voltage peaks which follow one another with different magnitudes in time. If the amplitudes and the frequencies of the two AC voltages are chosen appropriately, voltage peaks can be produced, of which the largest assume values such that they are in the range of high overvoltage with seed formation, followed by lower-amplitude voltage peaks, which are in the lower overvoltage range, in which the deposited seeds grow. As long as the voltage peaks of the sum voltage $U_{sum}(t)$ reach or exceed the high overvoltage range (corresponding to the system) in which seed formation takes place, seeds are formed on the substrate in this time period $\Delta_{t_1}$. As long as the voltage peaks of the sum voltage $U_{sum}(t)$ are below this voltage range in the range of low overvoltage, the seeds formed in the first time period $\Delta_{t_1}$, grow during this second time period $\Delta_{t_2}$. Depending on the superimposed waveform, successive time periods $\Delta_{t_1}$ may also be of different lengths, and the same is true for $\Delta_{t_2}$.

Figure 4C:
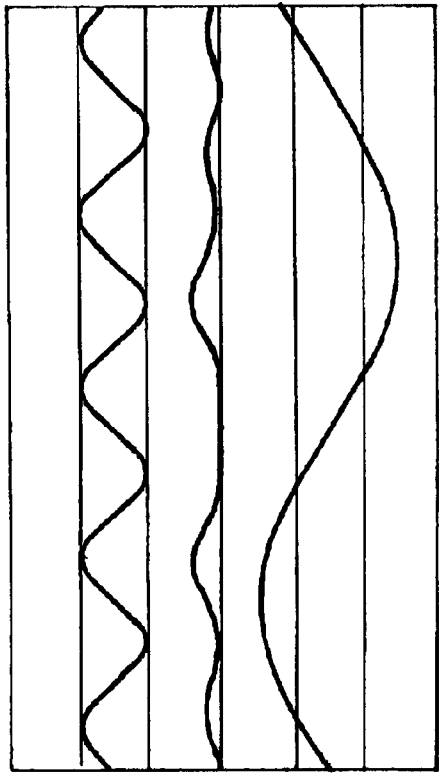

The sum voltage $U_{sum}(t)$ which is applied between the substrate 4 and the opposing electrode 3 in order to deposit a catalytically active layer on the substrate 4 preferably corresponds to a beat voltage. FIGS. 4b to 4f illustrate different preferred profiles of sum voltages, $U_{sum}$ which are suitable for deposition in the sense according to the invention. Sinusoidal voltages are superimposed in FIGS. 4b, 4c, with the differences between the magnitudes of the voltage peaks being varied. In FIG. 4c, the differences are on average small while, in FIG. 4b, the difference between the high and low voltage peaks is large.

Figure 4D:
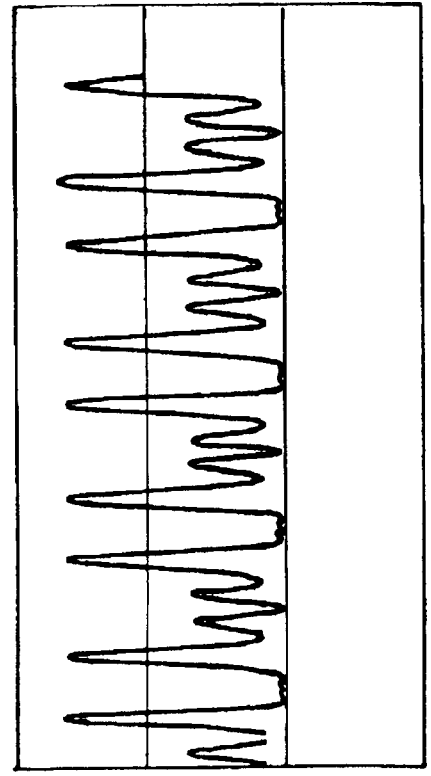
Figure 4E:
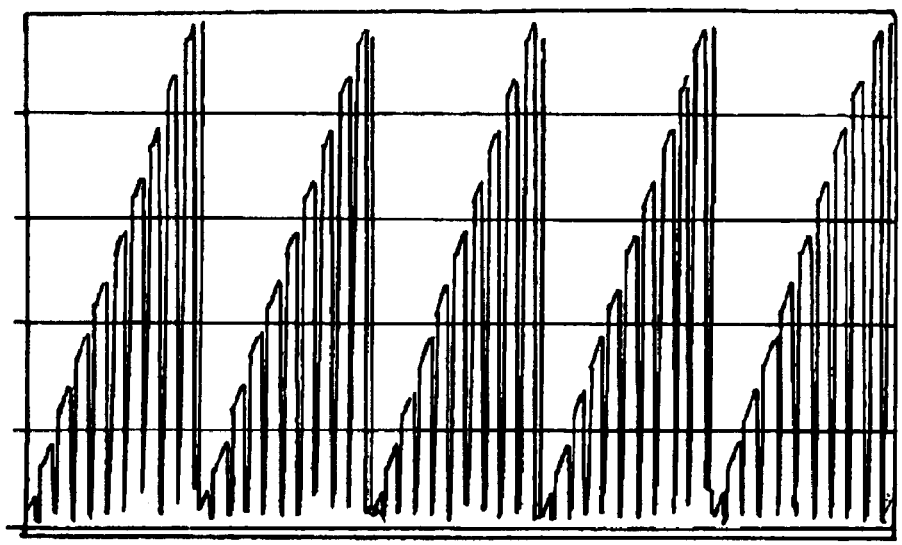
Figure 4F:
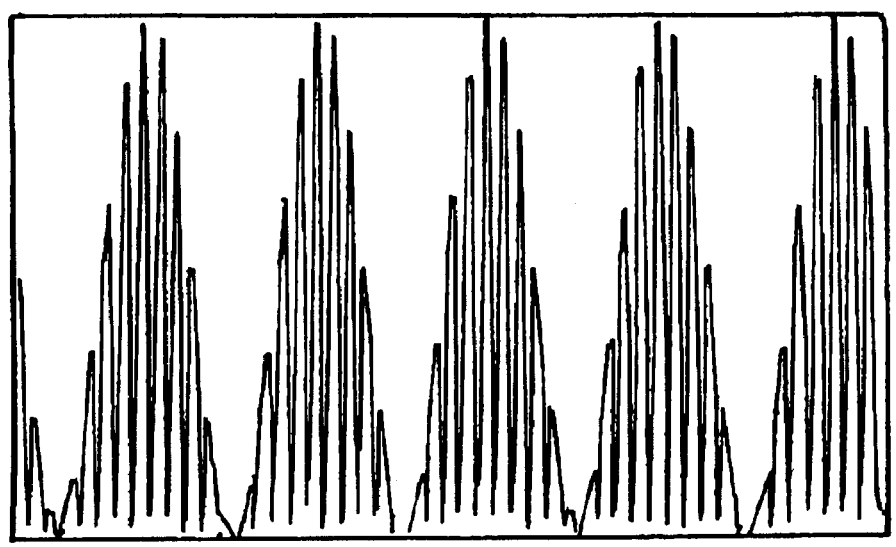

FIG. 4d shows the superimposition of a sinusoidal AC voltage with a sequence of voltage peaks at equidistant time intervals. The high peaks of the sum voltage extend into this region of high overvoltage with seed formation, while the low voltage peaks are preferably in the region of low overvoltage with seed growth. FIG. 4e and FIG. 4f show superimpositions of sinusoidal voltages with sawtooth or triangular waveform voltage profiles. The amplitude and the time sequence of the voltage peaks of the sum voltage $U_{sum}(t)$ can be varied within wide ranges, and can be matched to the desired system.

There is a good frequency range for the deposition of catalytically active material around a frequency of about 10 Hz, preferably up to a maximum of about 500 Hz. The frequency can preferably be matched to the ion mobility in the deposition bath 5 in the given deposition conditions. If the frequencies are close to one another, then the sum voltage $U_{sum}(t)$ has second maxima between the voltage maxima, the magnitudes differ little from the voltage maxima while, if the frequency differences are greater, the second maxima are considerably lower than the voltage maxima. A good amplitude ratio for the two superimposed AC voltages $U_1(t)$, $U_2(t)$ is in the range from 1:3 to 1:5.

It is also expedient to superimpose a constant voltage $U_o$ (offset voltage), so that the sum voltage $U_{sum}(t)$ on the substrate 4 does not change its mathematical sign, with only one voltage polarity being present.

The metal clusters 6.1 deposited on the substrate 4 have a typical size of about 2–4 nm. The thickness of the layer 7 is advantageously about 10–20 nm. The expression layer thickness is used in this case even though no closed layer is formed, but rather a porous coating preferably formed from non-cohesive clusters.

While, in contrast, normally electrochemically deposited layers are smooth and closed since granularity of the deposited material is generally undesirable in electrochemical deposition processes, the electrochemical coating deposited according to the invention is extremely porous and is composed of microscopically small, non-cohesive metal particles. This advantageously results in less of the catalytically active material being used for catalytic converter production. At the same time, the granularity of the deposited coating of metal clusters 6.1 means that the active surface area of the catalytic converter is very large.

Furthermore, the thermal coupling of the coating according to the invention to the substrate 4 is very good, since the clusters 6.1 are firmly connected to the substrate surface 4.1 and, in particular, no adhesion promoter is required. In addition to the thermal coupling, the adhesion of the metal clusters 6.1 on the substrate 4 is also very good. The catalytic converter overall has considerably better corrosion and erosion resistance. It is advantageous for the surface 4.1 of the substrate 4 to be roughened before the deposition of the catalytic material 6, 6.1. This can prevent the metal clusters 6.1, which are preferably formed, for example, on flanks or peaks on the surface, from running together, and also assists the granularity of the layer 7.

The following method steps are preferred for producing a preferred membrane flash electrode unit.

Platinum is deposited through an ion-conductive Nafion™ membrane onto carbon from hexachloroplatinic acid in 0.1 m $H_2SO_4$ with a content of 5 g/l Pt.

Platinum clusters are produced on the carbon substrate by superimposing a first AC voltage $U_1(t)$ with an amplitude $A_1$ of 2.6 V and at a frequency of 150 Hz and a second AC voltage $U_2(t)$ at the same frequency, but at a lower amplitude $A_2$. The deposition potential of platinum on carbon is around 1.3 V. 2.6 V is a voltage level which corresponds to a high overvoltage.

The AC voltages $U_1(t)$, $U_2(t)$ also have a voltage offset value $U_0$ superimposed on them, in order that the sum voltage $U_{sum}(t)$ on the substrate 4 remains positive in a preferable manner. It is particularly advantageous to choose the two AC voltages to have a high amplitude ratio of at least 0.5, preferably 0.65 –0.75.

If the amplitude of the first voltage $U_1(t)$ remains constant (for example 2.6 V), and the voltage offset value $U_0$ and the amplitude ratio are constant, the platinum clusters become larger when higher frequencies and/or higher platinum concentrations are used in the deposition bath or when the amplitude ratio is enlarged or $U_0$ is reduced with the first AC voltage $U_1(t)$ having a constant frequency and amplitude, and the platinum concentration in the deposition bath being constant.

A catalytic converter produced using the method according to the invention is particularly suitable for use as an exhaust gas catalytic converter for internal combustion engines, and can be produced in a particularly cost-saving manner due to the small amount of catalytically active material that is used. Furthermore, the improved erosion resistance means that such a catalytic converter is highly environmentally friendly, since considerably less catalytic converter material is released into the environment during the life of the catalytic converter.

One further advantageous use of the catalytic converter is in a stationary chemical reactor system, or a fuel cell system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a catalytic converter, comprising:

immersing a planar substrate in an electrolyte that contains the catalytically active metallic; and applying an electrical voltage between the substrate and an opposing electrode, said voltage comprising a high overvoltage for a first predetermined time period for seed formation, followed by a lower; overvoltage for a second predetermined time period for seed growth, whereby a layer of catalytically active metallic material is deposited by electrochemical deposition on the planar substrate; wherein said step of applying an electrical voltage comprises superimposing at least first and second AC voltages and applying a sum voltage of said first and second AC voltages between the substrate and the opposing electrode; and a first group of voltage maxima of the sum voltage have an amplitude that falls within or above a range of the high overvoltage for seed formation, and a second group of said voltage maxima have an amplitude that falls within a lower range for seed growth.

2. A method according to claim 1, wherein the electrical voltage has at least one of a sinusoidal, a sawtooth, or a square-wave voltage profile.

3. A method according to claim 1, wherein the sum voltage has a DC voltage superimposed on it, so that a voltage on the substrate is always of the same polarity.

4. A method according to claim 1, wherein amplitudes of said first and second AC voltages have a ratio of 1:3 to 1:5.

5. A method according to claim 1, wherein frequencies of said first and second AC voltages are between 10 Hz and 500 Hz.

6. A method according to claim 1, further comprising roughening the substrate before depositing the layer of catalytically active metallic material.

7. A method according to claim 5, further comprising covering the surface of the substrate with an ion-conducting material before depositing the layer of catalytically active metallic material.

8. A method according to claim 7, wherein:

the catalytically active metallic material comprises platinum;

the substrate comprises carbon; and the first and second AC voltages have a frequency of 150 Hz, with the first AC voltage having an amplitude of 2.6 V and the second AC voltage having an amplitude corresponding to an amplitude ratio of said first and second AC voltages of at least 0.5 being superimposed to form the sum voltage, thereby producing a membrane/electrode unit.

* * * * *